(12) United States Patent
Makino et al.

(10) Patent No.: US 9,106,007 B2
(45) Date of Patent: Aug. 11, 2015

(54) ELECTRICAL JUNCTION BOX

(71) Applicant: Yazaki Corporation, Tokyo (JP)

(72) Inventors: Masahiro Makino, Makinohara (JP);
Kouji Ueyama, Makinohara (JP)

(73) Assignee: Yazaki Corporation, Tokyo (JP)

( * ) Notice: Subject to any disclaimer, the term of this patent is extended or adjusted under 35 U.S.C. 154(b) by 12 days.

(21) Appl. No.: 14/087,414

(22) Filed: Nov. 22, 2013

(65) Prior Publication Data

US 2014/0154897 A1 Jun. 5, 2014

(30) Foreign Application Priority Data

Nov. 30, 2012 (JP) .................. 2012-262087

(51) Int. Cl.
| | |
|---|---|
| *H01R 13/46* | (2006.01) |
| *H01R 13/58* | (2006.01) |
| *H01R 9/16* | (2006.01) |
| *B60R 16/023* | (2006.01) |
| *H01R 11/12* | (2006.01) |

(52) U.S. Cl.
CPC ........ *H01R 13/5812* (2013.01); *B60R 16/0238* (2013.01); *H01R 9/16* (2013.01); *H01R 13/5804* (2013.01); *H01R 13/5837* (2013.01); *H01R 11/12* (2013.01)

(58) Field of Classification Search
CPC ................. H01R 13/5812; H01R 13/5837
See application file for complete search history.

(56) References Cited

U.S. PATENT DOCUMENTS

| | | | | |
|---|---|---|---|---|
| 3,732,526 | A * | 5/1973 | Punako | 439/471 |
| 3,803,530 | A * | 4/1974 | Lapraik | 439/892 |
| 3,889,909 | A * | 6/1975 | Koscik | 248/56 |
| 5,074,805 | A * | 12/1991 | Kirma | 439/452 |
| 5,897,392 | A * | 4/1999 | Takahashi et al. | 439/470 |
| 6,019,638 | A * | 2/2000 | Saka et al. | 439/620.15 |
| 6,083,038 | A * | 7/2000 | Wright | 439/473 |
| 8,043,111 | B2 * | 10/2011 | Takahashi et al. | 439/464 |
| 2001/0016450 | A1 * | 8/2001 | Gutris | 439/467 |
| 2014/0154896 | A1 * | 6/2014 | Makino et al. | 439/76.2 |
| 2014/0154897 | A1 * | 6/2014 | Makino et al. | 439/76.2 |

FOREIGN PATENT DOCUMENTS

JP 06-310198 A 11/1994

* cited by examiner

*Primary Examiner* — James Harvey
(74) *Attorney, Agent, or Firm* — Locke Lord LLP; James E. Armstrong, IV; Brian S. Matross

(57) ABSTRACT

An electrical junction box includes: a case main body to which a bolt is attached; a terminal of which one end is provided with a bolt insertion portion, of which the other end is provided with a wire connection portion, and of which the center is provided with a bent portion bent at right angle; two electric wires connected to the wire connection portion; and a side cover to which the terminal is attached. When the side cover is mounted on one side surface of the case main body, the bolt is inserted into the bolt insertion portion. The side cover is provided with a wire fixing piece having an arc-like sectional shape and extended along the one electric wire. The two electric wires are wound together with the wire fixing piece by a tape, and fixed to the wire fixing piece.

1 Claim, 12 Drawing Sheets

ELECTRICAL JUNCTION BOX

CROSS REFERENCE TO RELATED APPLICATIONS

This application is on the basis of Japanese Patent Application No. 2012-262087, the contents of which are hereby incorporated by reference.

TECHNICAL FIELD

The present invention relates to an on-vehicle electrical junction box.

BACKGROUND ART

An electrical junction box is mounted on a vehicle. Electrical junction boxes having various structures are available. For example, there is an electrical junction box having a side cover 305 shown in FIGS. 12 and 13 (see PTL 1). This side cover 305 is attached to one side surface of a case main body while having a terminal 4.

A bolt insertion portion 41 is provided on one end of the terminal 4, a wire connection portion 43 is provided on the other end of the terminal 4, and a bent portion 42 bent at right angle is provided on the center of the terminal 4. The wire connection portion 43 is defined by a plate portion 44 extended from the bent portion 42, a pair of core wire caulking pieces 46 extended vertically from both edges of the plate portion 44, and a pair of insulating cover caulking pieces 45 extended vertically from both edges of the plate portion 44.

The wire connection portion 43 is connected to two electric wires 11 shown in FIGS. 12 and 13, or connected to one electric wire 12 (see FIG. 15) of which diameter is larger than the electric wire 11. A sectional area of a conductor of the electric wire 12 is twice as large as a sectional area of a conductor of the electric wire 11. Further, when the two electric wires 11 are connected, while one electric wire 11 is overlapped with the plate portion 44, the other electric wire 11 is overlapped with the one electric wire 11 and separated from the plate portion 44, the electric wires 11 are caulked with the pair of core wire caulking pieces 46 and with the pair of insulating cover caulking pieces 45.

The side cover 305 is made of synthetic resin. The side cover 305 is provided with a cover main body 50 covering a notch formed on one side surface of the case main body, a hook 51 supporting the bent portion 42 of the terminal 4, and a wire fixing piece 353 extended in a plate shape from a lower end of the cover main body 50 and along the electric wire 11 connected to the wire connection portion 43.

As shown in FIG. 13, the wire fixing piece 353 follows the electric wire 11 separated from the plate portion 44. Further, the two electric wires 11 are wound together with the wire fixing piece 353 by a tape and fixed to the wire fixing piece 353. Reference sign 13 in FIG. 12 denotes the tape. Further, in FIG. 13, the tape is not shown (omitted).

In an electrical junction box having the above side cover 305, when the side cover 305 to which the terminal 4 is attached is mounted on one side surface of the case main body, a shaft of a bolt is inserted into the bolt insertion portion 41 of the terminal 4. Then, a nut is screwed on the shaft to fix the terminal 4 to the case main body.

CITATION LIST

Patent Literature

PTL 1: JP, A, H06-310198

SUMMARY OF INVENTION

Technical Problem

However, there are various problems below in the electrical junction box having the above side cover 305. These problems will be explained with reference to FIGS. 14 and 15.

First, a first problem will be explained. As explained above, the wire fixing piece 353 is formed in a plate shape. Therefore, as shown in FIG. 14, when the two electric wires 11 are wound and fixed to the wire fixing piece 353 with a tape, the electric wires 11 are not stable and displaced, and thereby there is a problem that workability is reduced. Further, as shown in FIG. 15, when the one electric wire 12 is wound and fixed to the wire fixing piece 353 with a tape, because a gap is generated between the electric wire 12 and the wire fixing piece 353, the electric wire 12 is not stable and displaced, and thereby there is a problem that workability is reduced.

Next, a second problem will be explained. In the above electrical junction box, when the side cover 305 is attached to one side surface of the case main body, a shaft of a bolt is inserted into the bolt insertion portion 41 of the terminal 4. At this time, if a distance from the wire fixing piece 353 to the bolt insertion portion 41 is equal to a distance from the wire fixing piece 353 to the shaft of the bolt, the shaft of the bolt is inserted into the bolt insertion portion 41 when the side cover 305 is attached to one side surface of the case main body. In a case of two electric wires 11 shown in FIG. 14, the distance from the wire fixing piece 353 to the bolt insertion portion 41 is a distance G1 and equal to the distance from the wire fixing piece 353 to the shaft of the bolt. Therefore, when the side cover 305 is attached to one side surface of the case main body, the shaft of the bolt is inserted into the bolt insertion portion 41. However, in a case of one electric wire 12 shown in FIG. 15, the distance from the wire fixing piece 353 to the bolt insertion portion 41 is a distance G2 and shorter than the distance from the wire fixing piece 353 to the shaft of the bolt. Therefore, when the side cover 305 is attached to one side surface of the case main body, there is a problem the shaft of the bolt cannot be inserted into the bolt insertion portion 41.

Accordingly, a first object of the present invention is to provide an electrical junction box allowing an electric wire to be easily wound and fixed to a wire fixing piece of a side cover with a tape. A second object of the present invention is to provide an electrical junction box allowing an electric wire to be easily wound and fixed to a wire fixing piece of a side cover with a tape, and allowing a bolt to be easily inserted into a bolt insertion portion even when either of two types of electric wire having different outer diameters is used.

Solution to Problem

For attaining the first object, according to a first aspect of the present invention, there is provided an electrical junction box including:
a case main body to which a bolt is attached;
a terminal of which one end is provided with a bolt insertion portion, and the other end is provided with a wire connection portion;
an electric wire connected to the wire connection portion; and
a side cover to which the terminal is attached,
wherein the bolt is inserted into the bolt insertion portion by mounting the side cover on a side surface of the case main body,
wherein the side cover is provided with a wire fixing piece extended along the electric wire, and wherein a sectional shape of the wire fixing piece is a shape having a space for receiving the electric wire at an opposite side to the bolt insertion portion with respect to a straight line connecting both ends of the wire fixing piece.

For attaining the second object, according to a second aspect of the present invention, there is provided the electrical junction box as described in the first aspect, wherein when two of first electric wires are used, the wire fixing piece abuts on an outer periphery of one of the first electric wires, wherein when one of second electric wire of which diameter is larger than the first electric wire is used, only both ends of the wire fixing piece abut on an outer periphery of the second electric wire, and wherein when either of the first and second electric wires is used, a distance from the wire fixing piece to the bolt insertion portion is kept in a position where the bolt is inserted into the bolt insertion portion.

Advantageous Effects of Invention

According to the invention described in the first aspect, because the sectional shape of the wire fixing piece is a shape having a space for receiving the electric wire at an opposite side to the bolt insertion portion with respect to a straight line connecting both ends of the wire fixing piece, the electric wire is stable and hard to be displaced while the wire fixing piece is extended along the electric wire. Therefore, there can be provided an electrical junction box allowing an electric wire to be easily wound and fixed to a wire fixing piece of a side cover with a tape.

According to the invention described in the second aspect, when two of first electric wires are used, the wire fixing piece abuts on an outer periphery of one of the first electric wires. When one of second electric wire of which diameter is larger than the first electric wire is used, only both ends of the wire fixing piece abut on an outer periphery of the second electric wire. When either of first and second electric wires is used, a distance from the wire fixing piece to the bolt insertion portion is kept in a position where the bolt is inserted into the bolt insertion portion. Therefore, there can be provided an electrical junction box allowing an electric wire to be easily wound and fixed to a wire fixing piece of a side cover with a tape, and allowing a bolt to be easily inserted into a bolt insertion portion even when either of two types of electric wire having different outer diameters is used with respect to the common side cover and the common terminal.

These and other objects, features, and advantages of the present invention will become more apparent upon reading of the following detailed description along with the accompanied drawings.

DESCRIPTION OF EMBODIMENTS

First Embodiment

An electrical junction box according to a first embodiment of the present invention will be explained with reference to FIGS. 1 to 9. The electrical junction box of the present invention is mounted on a vehicle, and supplies electric power and signals to on-vehicle electronic devices.

Figure 1:
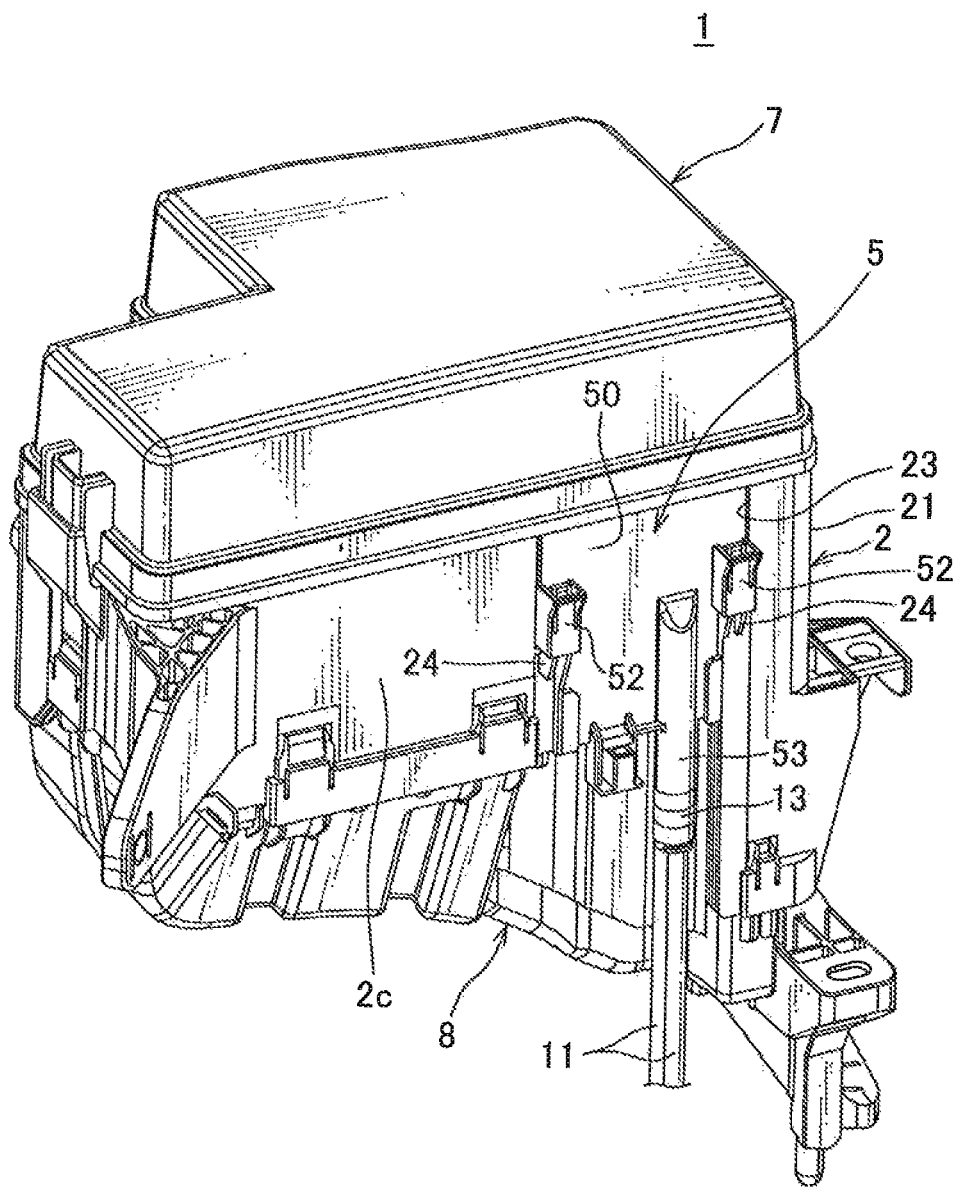
FIG. 1 is a perspective view showing an electrical junction box according to a first embodiment of the present invention.
Figure 2:
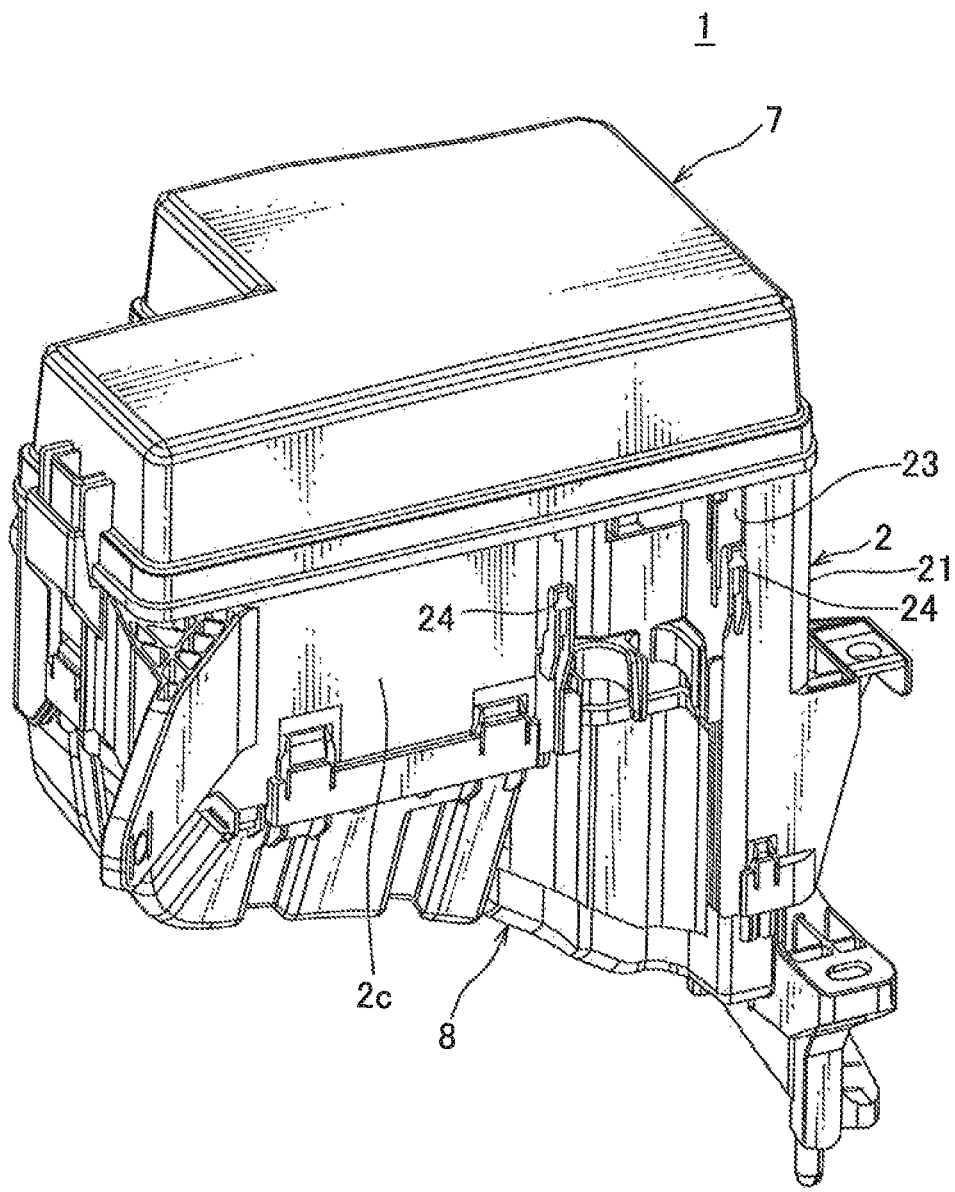
FIG. 2 is a perspective view showing a condition that a side cover shown in FIG. 1 is removed.
Figure 3:
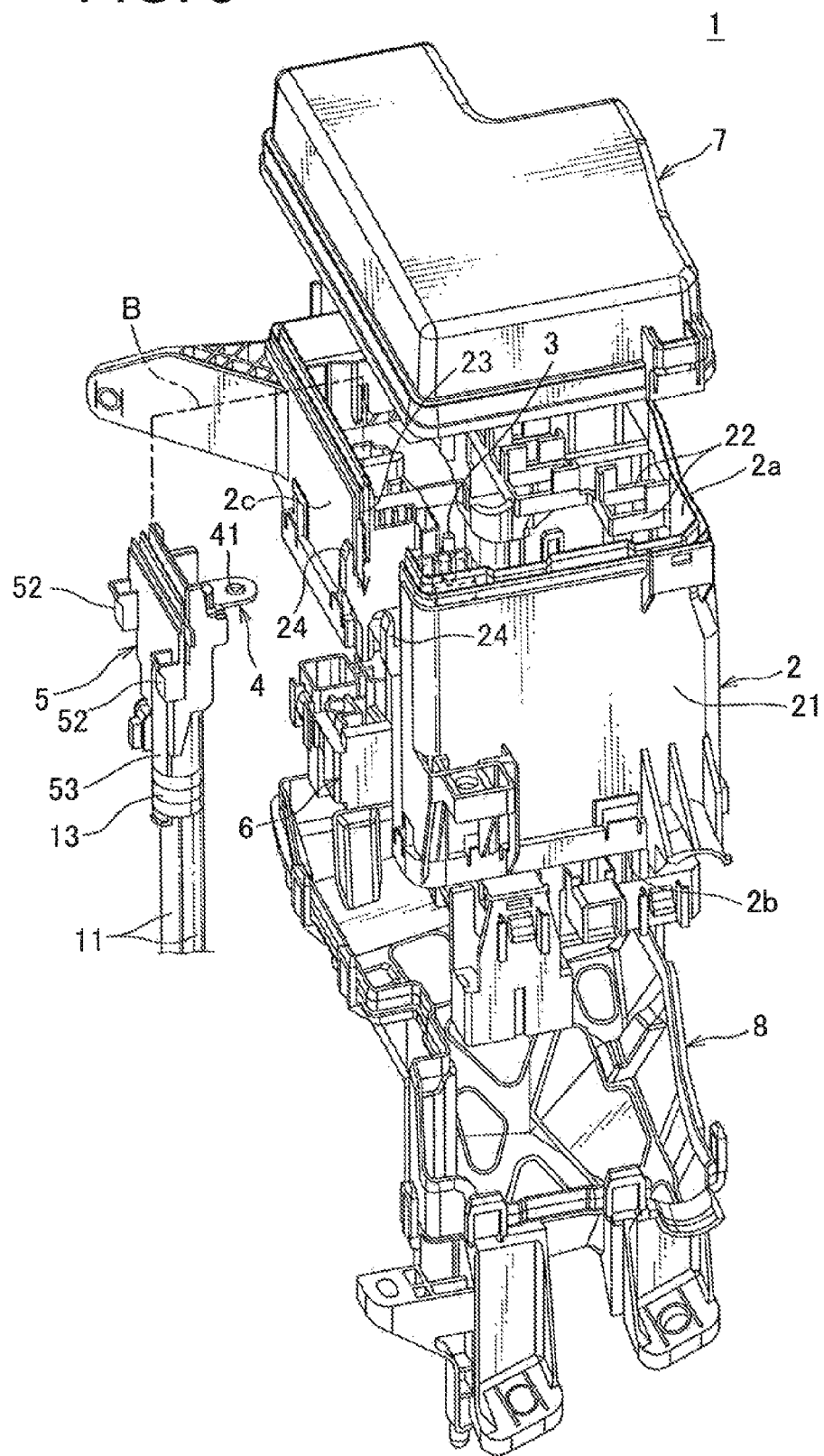
FIG. 3 is an exploded view showing the electrical junction box shown in FIG. 1.

As shown in FIGS. 1 to 3, this electrical junction box 1 includes: a case main body 2; a cassette block 6 assembled to the case main body 2; a plurality of components such as a bolt 3 or a bus bar 9 (only shown in FIG. 4) assembled to the cassette block 6; a terminal 4; two electric wires 11 (corresponding to first electric wire in claims) connected to the terminal 4; a side cover 5 attached to one side surface 2c of the case main body 2 while having the terminal 4; an upper cover 7 attached to an upper surface 2a of the case main body 2; and a lower cover 8 attached to a lower surface 2b of the case main body 2.

The case main body 2 is made of synthetic resin, and includes: an outer wall 21 having the one side surface 2c; and a partition wall partitioning an inside of the outer wall 21. A notch 23 is provided on a portion where the side cover 5 is mounted on the one side surface 2c of the outer wall 21. A Lock 24 is provided on each of both sides of the notch 23. Further, in this embodiment, the case main body 2 is formed separately from the cassette block 6. However, the case main body 2 may be formed integrally with the cassette block 6.

The cassette block 6 is made of synthetic resin, and formed in a block shape. The bolt 3, the bus bar 9, a relay, a fuse, a connector, and the like are attached to the cassette block 6.

Figure 4:
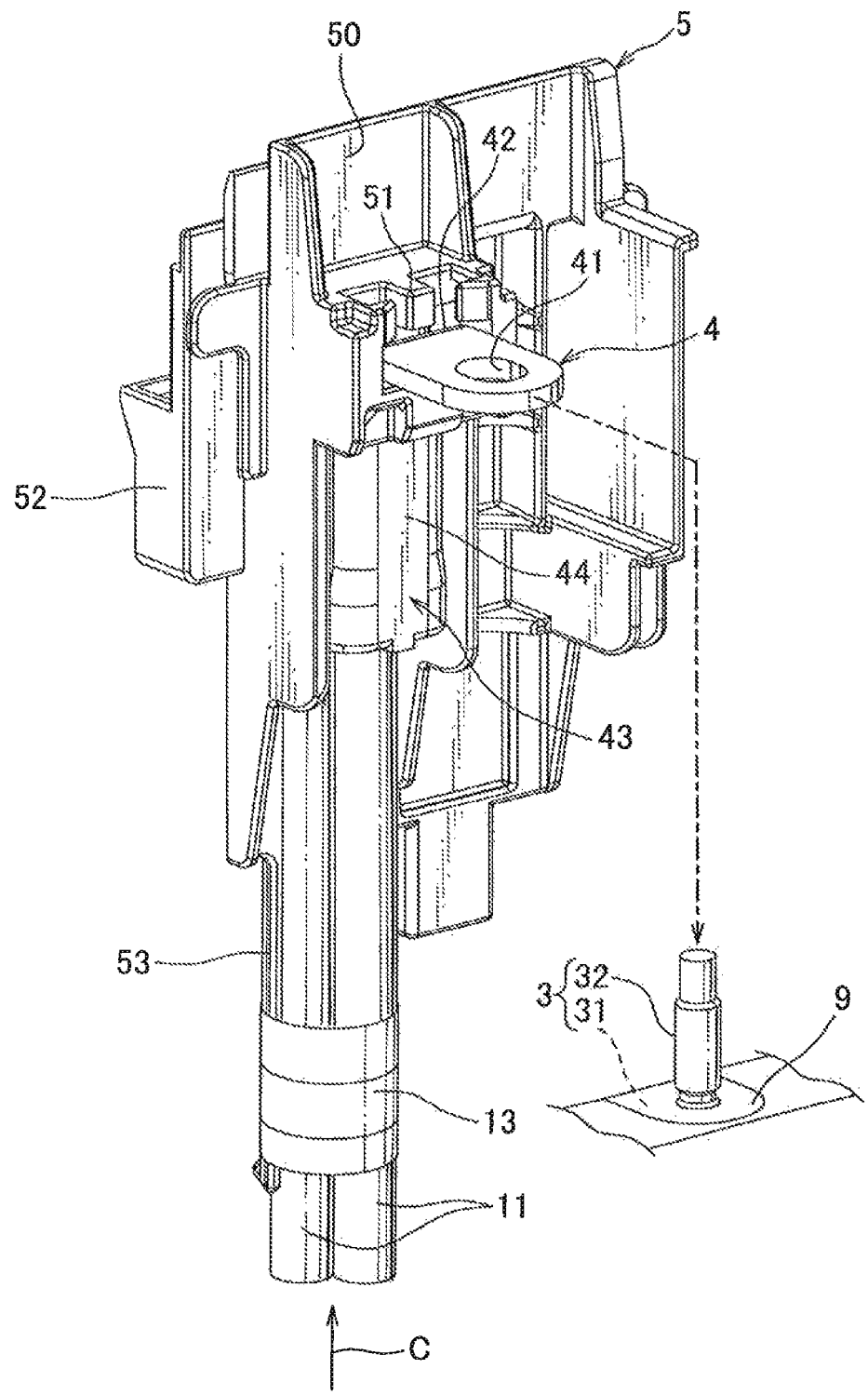
FIG. 4 is a perspective view showing the side cover, a terminal, and an electric wire shown in FIG. 3 from a different angle.

As shown in FIG. 4, the bolt 3 includes: a head 31 assembled to the cassette block 6; and a shaft 32. When the cassette block 6 is assembled to the case main body 2, the shaft 32 is extended vertically from the upper surface 2a of the case main body 2. This bolt 3 holds the terminal 4 overlapped with the bus bar 9 by sandwiching with a nut to maintain a condition that the bus bar 9 and the terminal 4 are electrically connected to each other.

Figure 6:
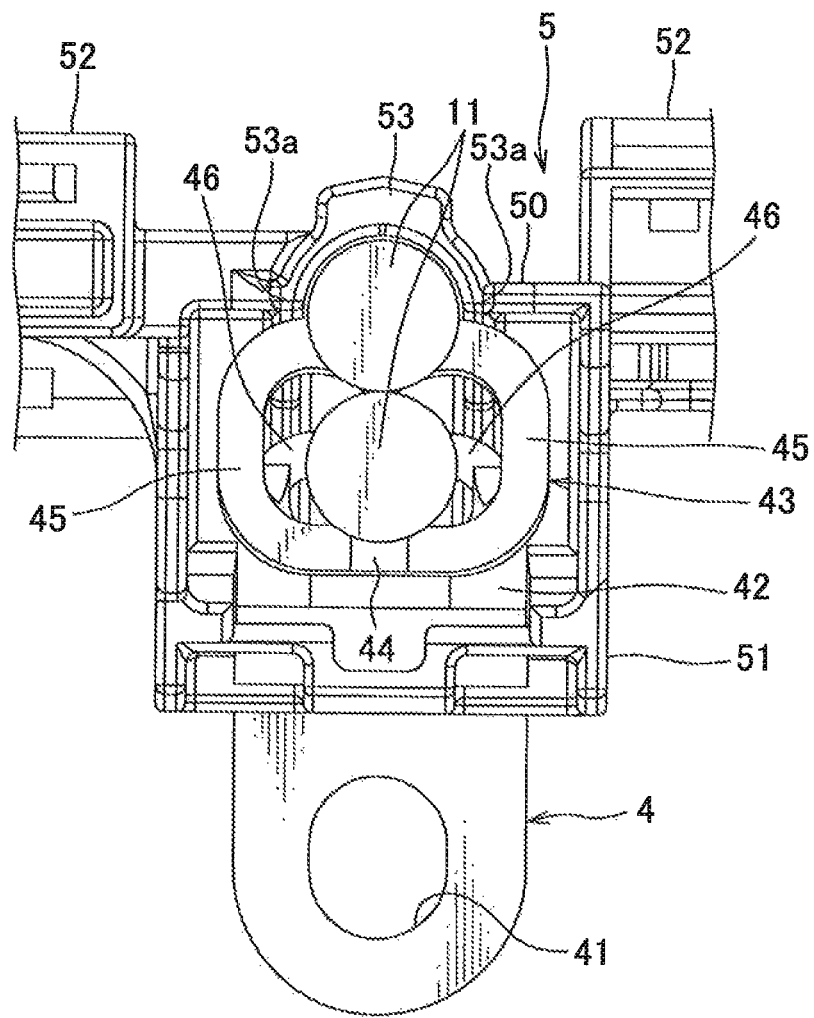
FIG. 6 is a bottom view showing the side cover, the terminal, and the electric wire shown in FIG. 4 from an arrow C direction in FIG. 4.

The terminal 4 is made by pressing a metal plate or the like. As shown in FIGS. 4 and 6, a bolt insertion portion 41 is provided on one end of the terminal 4, a wire connection portion 43 is provided on the other end of the terminal 4, and a bent portion 42 bent at right angle is provided on the center of the terminal 4. The wire connection portion 43 is defined by a plate portion 44 extended from the bent portion 42, a pair of core wire caulking pieces 46 extended vertically from both edges of the plate portion 44, and a pair of insulating cover caulking pieces 45 extended vertically from both edges of the plate portion 44.

The above electric wire 11 supplies electric power from a power source such as a battery or an alternator to the bus bar 9 of the electrical junction box 1, and is a round electric wire having a plurality of core wires and an insulating cover covering the core wires. A conductor sectional area of the electric wire 11 (a sum of sectional areas of core wires) is 15 mm$^2$. Further, in this embodiment, two electric wires 11 having the same structures are used. These two electric wires 11 are arranged in a thickness direction of the plate portion 44, and connected to the single terminal 4. Namely, one electric wire 11 is overlapped with the plate portion 44, and the other electric wire 11 is overlapped with the one electric wire and not abutted on the plate portion 44. These two electric wires 11 are caulked with the pair of core wire caulking pieces 46 and with the pair of insulating cover caulking pieces 45. Further, at an end of each electric wire 11, the insulating cover is removed, and the core wire is exposed.

Figure 5:
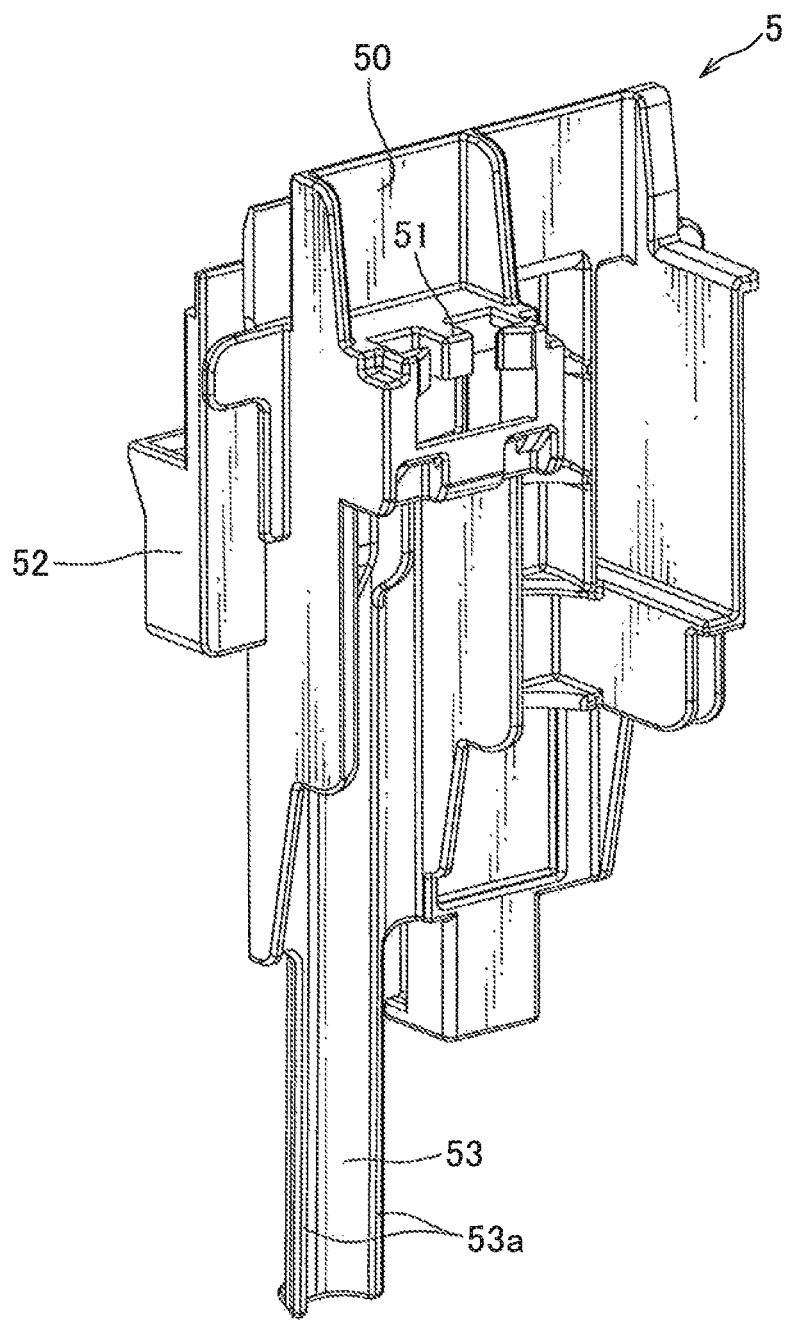
FIG. 5 is a perspective view showing only the side cover shown in FIG. 4.

The side cover 5 is made of synthetic resin. As shown in FIGS. 4 to 6, the side cover 5 is provided with a cover main body 50 attached to the one side surface 2c of the case main body 2 in a manner to close the notch 23 and defining the outer wall 21 of the case main body 2, a hook 51 continued to an inner surface of the cover main body 50 and into which the terminal 4 is inserted to hold the bent portion 42 of the terminal 4, a lock receiving portion 52 for locking with the lock 24, and a wire fixing piece 53 extended along the electric wire 11.

The wire fixing piece 53 is extended downward from a lower end of the cover main body 50. A sectional shape of the wire fixing piece 53 according to the present invention has a space located opposite to the bolt insertion portion 41 with respect to a straight line connecting both ends of the wire fixing piece 53 for receiving the electric wire 11, and in this embodiment, the wire fixing piece 53 is formed in a gutter shape having an arc-like sectional shape. Further, a phrase "a shape having a space for receiving the electric wire" in claims means a shape having a space for receiving at least a part of one electric wire.

Figure 8:
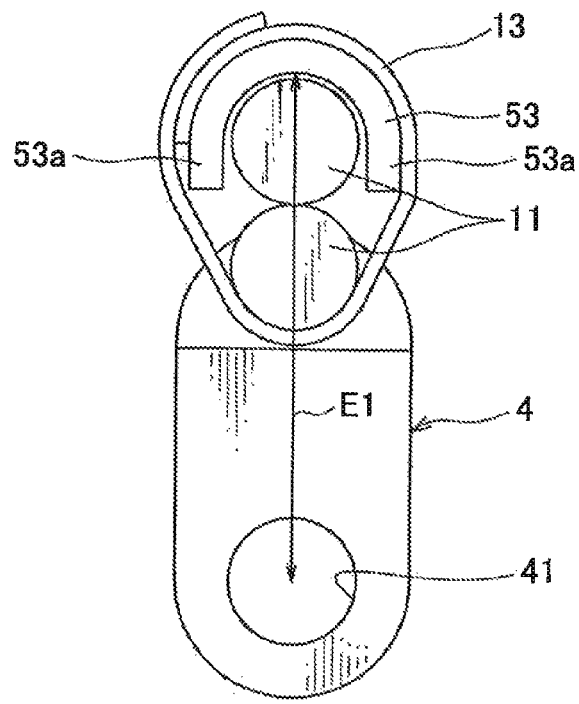
FIG. 8 is an explanatory view explaining a positional relationship among the two electric wires, a wire fixing piece, and a bolt insertion portion shown in FIG. 4.

As shown in FIGS. 4 and 8, such a wire fixing piece 53 receives a part of the electric wire 11 separated from the plate portion 44 in the space, and abuts on an outer periphery of this electric wire 11. Further, the two electric wires 11 are wound together with the wire fixing piece 53 by a tape, and fixed to the wire fixing piece 53. Reference sign 13 in FIG. 4 denotes this tape. Further, in FIG. 6, the tape 13 is omitted.

Further, as shown in FIG. 8, when the two electric wires 11 are wound with a tape and fixed to the wire fixing piece 53, the wire fixing piece 53 abuts on a half of the outer periphery of the electric wire 11 separated from the plate portion 44. Namely, the wire fixing piece 53 wraps the electric wires 11, thereby the electric wires 11 are stable and hard to be displaced. Therefore, the electric wires 11 can be easily wound with a tape and fixed.

When the terminal 4 is attached to the side cover 5, the two electric wires 11 are previously connected to the wire connection portion 43. Then, while one end of the terminal 4 (a portion where the bolt insertion portion 41 is provided) is raised parallel to the cover main body 50, the one end of the terminal 4 is inserted into the hook 51 from a bottom of the hook 51. Then, from this condition, the terminal 4 is rotated 90 degrees to be attached.

In this electrical junction box 1, when the side cover 5 having the terminal 4 is attached to the one side surface 2c of the case main body 2 in an arrow B direction in FIG. 3, the shaft 32 of the bolt 3 is inserted into the bolt insertion portion 41 of the terminal 4. Further, a distance E1 (shown in FIG. 8) from the wire fixing piece 53 to the bolt insertion portion 41 is equal to a distance from the wire fixing piece 53 to the shaft 32 of the bolt 3. Thereby, the shaft 32 of the bolt 3 is inserted into the bolt insertion portion 41 by an action that the side cover 5 is mounted on the one side surface 2c of the case main body 2. Then, when a nut is screwed onto the shaft 32, the terminal 4 is fixed to the case main body 2 and a connection condition between the terminal 4 and the bus bar 9 is maintained.

Figure 7:
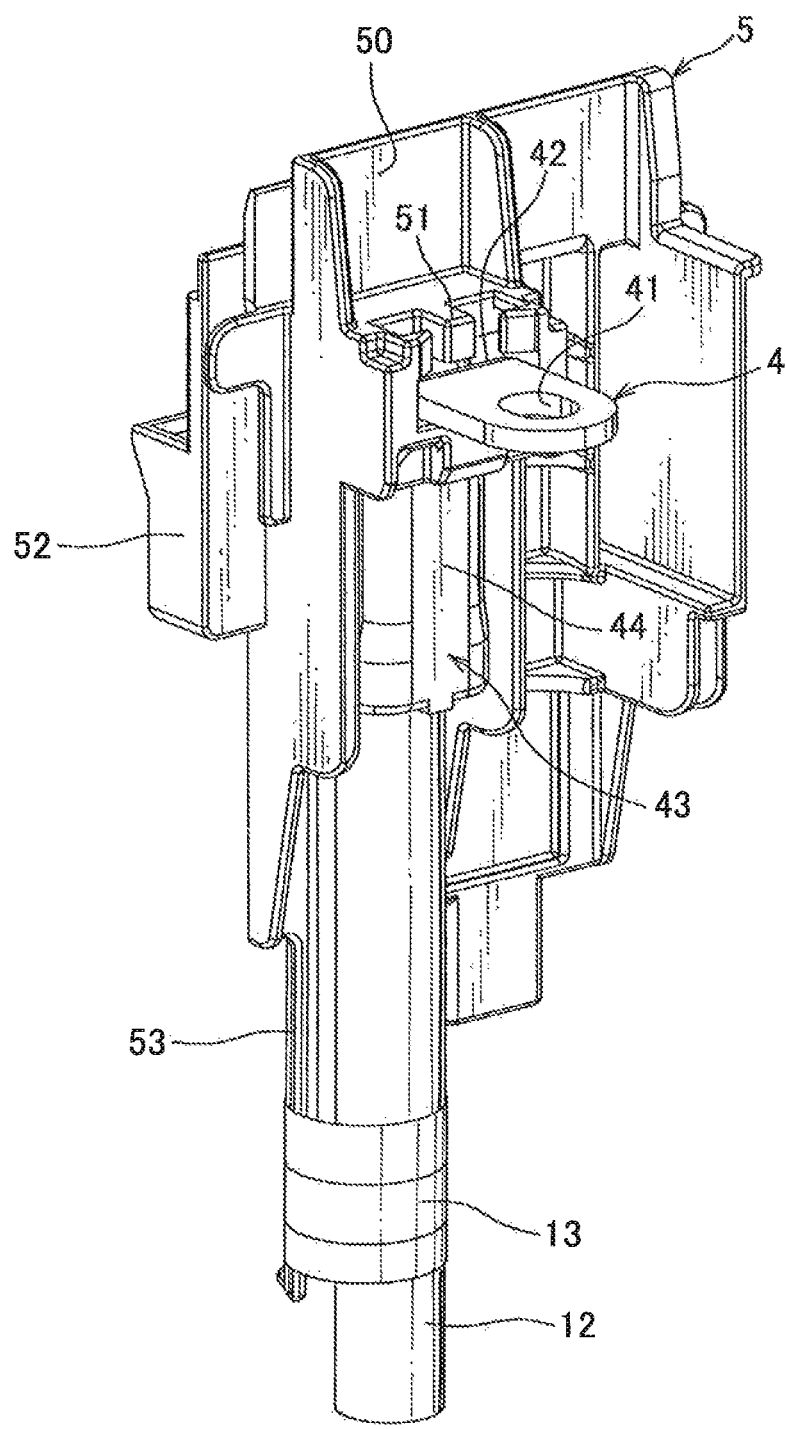
FIG. 7 is a perspective view showing a condition that two electric wires shown in FIG. 4 is changed to one electric wire of which diameter is large.

Further, in the electrical junction box 1, a single electric wire 12 (corresponding to the second electric wire in claims) shown in FIG. 7 can be used instead of the two electric wires 11. The terminal 4 and the side cover 5 shown in FIG. 7 are the same as shown in FIG. 4. Similar to the electric wire 11, the electric wire 12 supplies electric power from a power source such as a battery or an alternator to the bus bar 9 of the electrical junction box 1, and is a round electric wire having a plurality of core wires and an insulating cover covering the core wires. A conductor sectional area of the electric wire 12 (a sum of sectional areas of core wires) is 30 mm$^2$. Namely, when the two electric wires 11 are used, because the conductor sectional area of each electric wire 11 is 15 mm$^2$, the sum of the conductor sectional areas of the two electric wires 11 is 30 mm$^2$. Therefore, when the electric wire 12 is solely used, the conductor sectional area thereof is twice as that of the electric wire 11 and is 30 mm$^2$.

Figure 9:
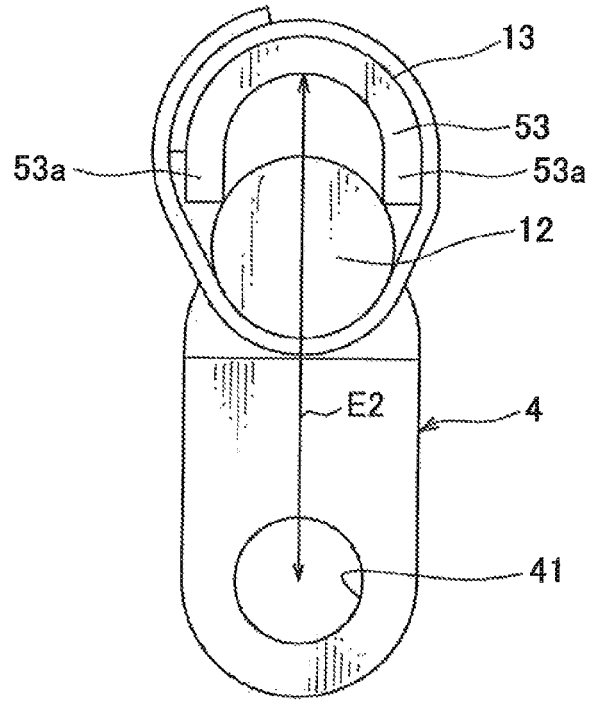
FIG. 9 is an explanatory view explaining a positional relationship among the one electric wire, the wire fixing piece, and the bolt insertion portion shown in FIG. 7.

As shown in FIGS. 7 and 9, when the electric wire 12 is used, the wire fixing piece 53 receives a part of the electric wire 12 in the space, and only both ends 53a of the wire fixing piece 53 abut on an outer periphery of the electric wire 12. This electric wire 12 is wound together with the wire fixing piece 53 by a tape, and fixed to the wire fixing piece 53.

Further, when the electric wire 12 is wound together with the wire fixing piece 53 by a tape, and fixed to the wire fixing piece 53, as shown in FIG. 9, only both ends 53a of the wire fixing piece 53 abut on an outer periphery of the electric wire 12, and the wire fixing piece 53 receives a part of the electric wire 12 in the space. Therefore, the electric wire 12 is stable and hard to be displaced. Therefore, the electric wire 12 can be easily wound with a tape and fixed.

In this way, a curvature radius and the center angle of the wire fixing piece 53 is determined so that when the two electric wires 11 having the conductor sectional area of 15 mm$^2$ are used, the wire fixing piece 53 abuts on the outer periphery of the one electric wire 11, and when the single electric wire 12 having the conductor sectional area of 30 mm² is used, only both ends 53a of the wire fixing piece 53 abut on the outer periphery of the electric wire 12. Therefore, two types of the electric wires 11, 12 having the different outer diameters can be used to the common side cover 5 and the common terminal 4, and either one of the electric wires 11, 12 can be easily wound with a tape and fixed. Further, because the wire fixing piece 53 is formed in an arc-like sectional shape, the strength thereof is higher than that formed in a plate shape.

Further, when the single electric wire 12 is used also, a distance from the wire fixing piece 53 to the bolt insertion portion 41 is equal to a distance from the wire fixing piece 53 to the shaft 32 of the bolt 3. Thereby, when the single electric wire 12 is used also, the shaft 32 of the bolt 3 is automatically inserted into the bolt insertion portion 41 by an action that the side cover 5 is mounted on the one side surface 2c of the case main body 2.

Further, according to the present invention, it is not necessary that the distance from the wire fixing piece 53 to the bolt insertion portion 41 is perfectly equal to the distance from the wire fixing piece 53 to the shaft 32 of the bolt 3. A slight error is acceptable as long as the shaft 32 of the bolt 3 is automatically inserted into the bolt insertion portion 41 by an action that the side cover 5 is mounted on the one side surface 2c of the case main body 2.

In this way, in the electrical junction box 1, the wire fixing piece 53 designed so that when either of the two types of the electric wires 11, 12 is used, the distance from the wire fixing piece 53 to the bolt insertion portion 41 allows the shaft 32 of the bolt 3 to be inserted into the bolt insertion portion 41. Therefore, when either of the two types of the electric wires 11, 12 is used, the shaft 32 of the bolt 3 can be easily inserted into the bolt insertion portion 41.

Second Embodiment

Figure 10:
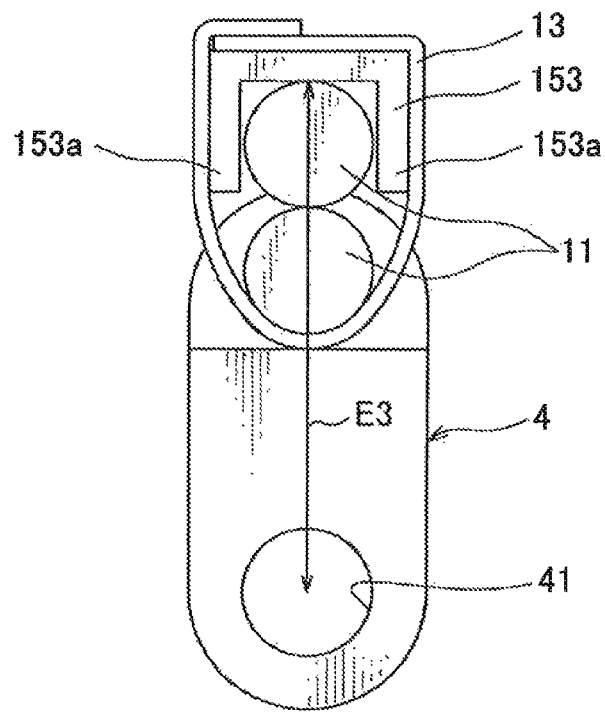
FIG. 10 is an explanatory view explaining a positional relationship among the two electric wires, the wire fixing piece, and the bolt insertion portion defining an electrical junction box according to a second embodiment of the present invention.
Figure 11:
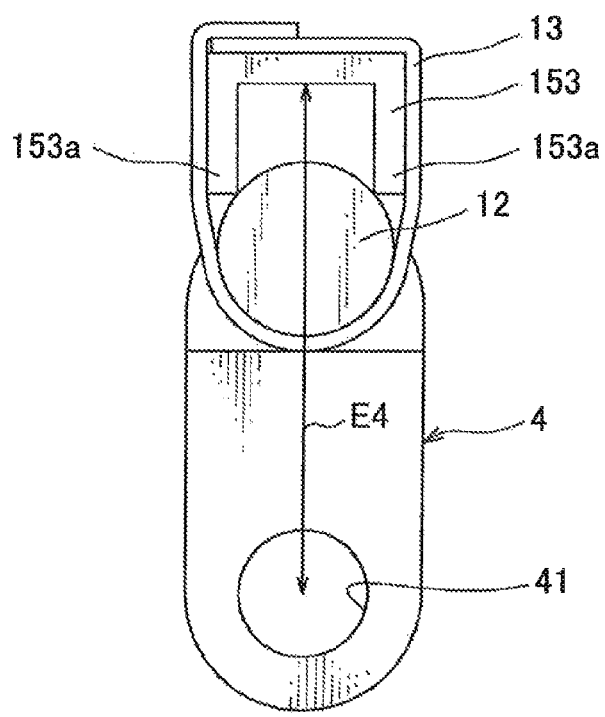
FIG. 11 is an explanatory view explaining a positional relationship among the one electric wire, the wire fixing piece, and the bolt insertion portion when the two electric wires shown in FIG. 10 is changed to the one electric wire of which diameter is large.
Figure 12:
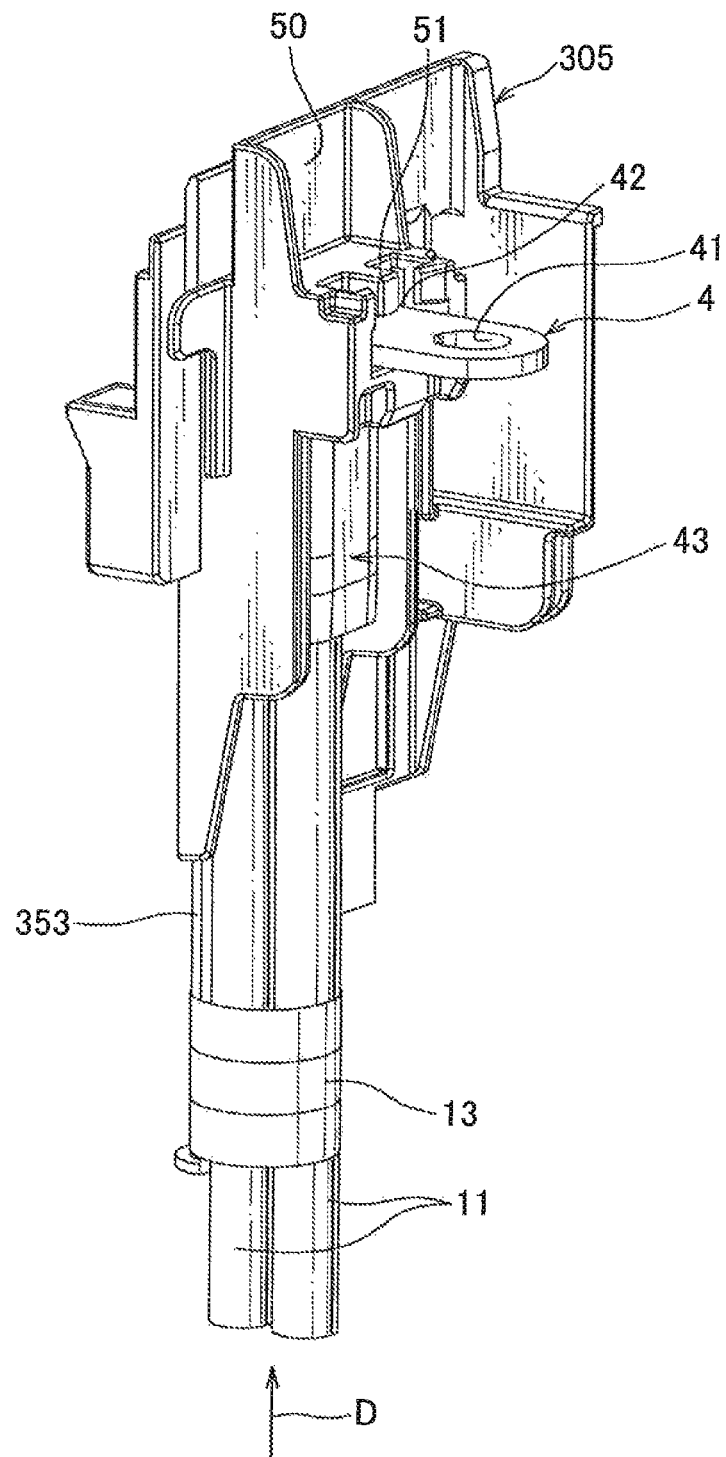
FIG. 12 is a perspective view showing a side cover, a terminal, and an electric wire defining a conventional electrical junction box.
Figure 13:
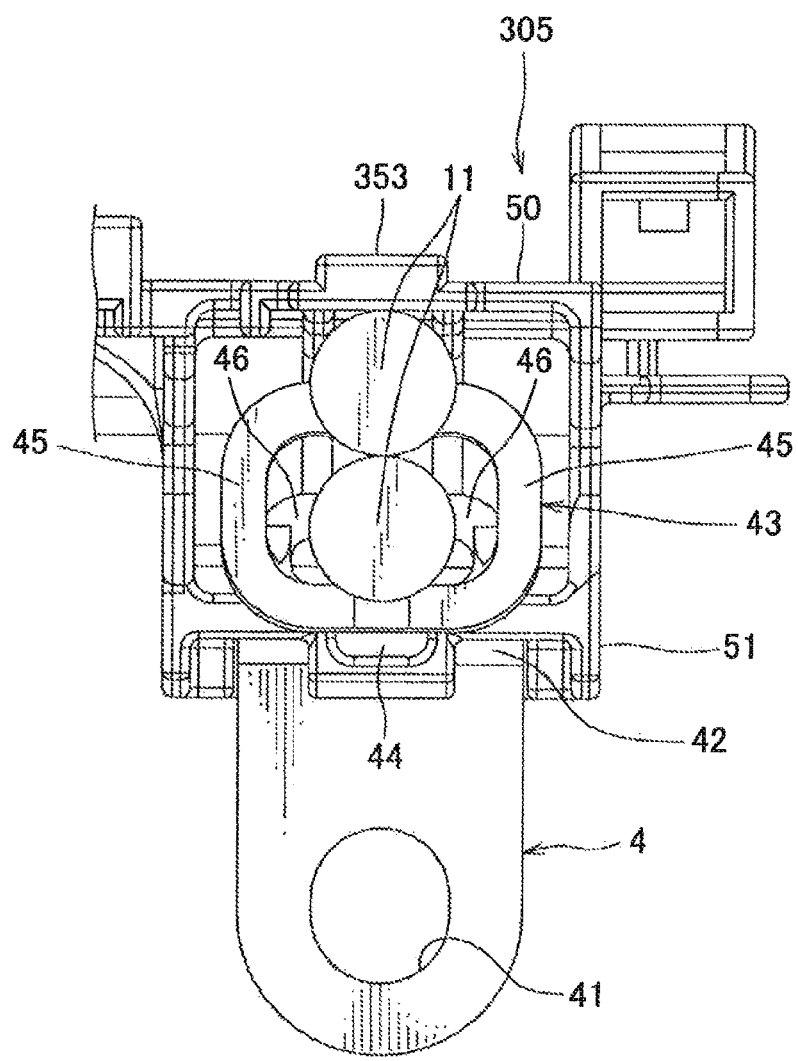
FIG. 13 is a bottom view showing the side cover, the terminal, and the electric wire shown in FIG. 12 from an arrow D direction.
Figure 14:
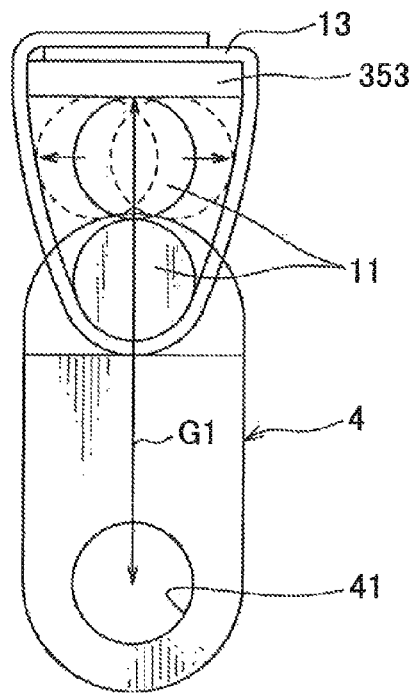
FIG. 14 is an explanatory view explaining a positional relationship among the two electric wires, the wire fixing piece, and the bolt insertion portion shown in FIG. 12.
Figure 15:
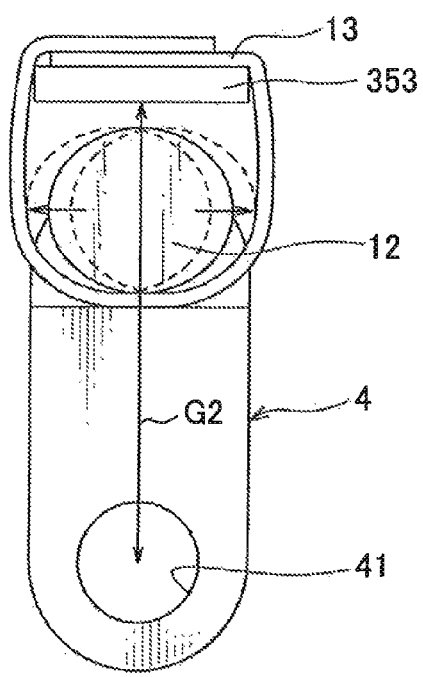
FIG. 15 is an explanatory view explaining a positional relationship among one electric wire, the wire fixing piece, and the bolt insertion portion when the two electric wires shown in FIG. 12 is changed to the one electric wire of which diameter is large.

An electrical junction box according to a second embodiment of the present invention will be explained with reference to FIGS. 10 and 11. In FIGS. 10 and 11, the same components as the first embodiment are denoted by the same reference signs, and an explanation thereof is omitted.

In the electrical junction box of this embodiment, a side cover is provided with a wire fixing piece 153 shown in FIGS. 10 and 11 instead of the wire fixing piece 53 explained in the first embodiment. The other components are the same as the first embodiment, and an explanation thereof is omitted.

As shown in FIGS. 10 and 11, a sectional shape of the wire fixing piece 153 has a space for receiving at least a part of the electric wires 11, 12 located opposite to the bolt insertion portion 41 with respect to a straight line connecting both ends 153a of the wire fixing piece 153. In this embodiment, the wire fixing piece 153 is formed in a gutter shape with substantially a U-shaped sectional shape (opened rectangular sectional shape).

As shown in FIG. 10, when two electric wires 11 are used, the wire fixing piece 153 receives a part of the one electric wire 11 in the space, and abuts on the outer periphery of the one electric wire 11. Further, a distance E3 from the wire fixing piece 153 to the bolt insertion portion 41 is equal to a distance from the wire fixing piece 153 to the shaft 32 of the bolt 3 (see FIGS. 3 and 4).

As shown in FIG. 11, when the single electric wire 12 is used, the wire fixing piece 153 receives a part of the electric wire 12 in the space, and only both ends 153a of the wire fixing piece 153 abut on the outer periphery of the electric wire 12. Further, a distance E4 from the wire fixing piece 153 to the bolt insertion portion 41 is equal to a distance from the wire fixing piece 153 to the shaft 32 of the bolt 3 (see FIGS. 3 and 4).

In this way, according to the electrical junction box of this embodiment, similar to the electrical junction box 1 explained in the first embodiment, when either of two types of the electric wires 11, 12 having different outer diameters is used, the electric wire can be easily wound with a tape and fixed to the wire fixing piece 153 of the side cover, and the shaft 32 of the bolt 3 can be easily inserted into the bolt insertion portion 41 with respect to the common side cover and the common terminal 4.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

REFERENCE SIGNS LIST 1 electrical junction box
2 case main body
3 bolt
4 terminal
5 side cover
11 electric wire (first electric wire)
12 electric wire (second electric wire)
41 bolt insertion portion
43 wire connection portion
53, 153 wire fixing piece

What is claimed is:

1. An electrical junction box comprising:
a case main body to which a bolt is attached;
a terminal of which one end is provided with a bolt insertion portion, and the other end is provided with a wire connection portion;
an electric wire connected to the wire connection portion; and
a side cover to which the terminal is attached,
wherein the bolt is inserted into the bolt insertion portion by mounting the side cover on a side surface of the case main body,
wherein the side cover is provided with a wire fixing piece extended along the electric wire,
wherein a sectional shape of the wire fixing piece is a shape having a space for receiving the electric wire at an opposite side to the bolt insertion portion with respect to a straight line connecting both ends of the wire fixing piece,
wherein when two of first electric wires are used, the wire fixing piece abuts on an outer periphery of one of the first electric wires,
wherein when one of second electric wire of which diameter is larger than the first electric wire is used, only both ends of the wire fixing piece abut on an outer periphery of the second electric wire, and
wherein when either of the first and second electric wires is used, a distance from the wire fixing piece to the bolt insertion portion is kept in a position where the bolt is inserted into the bolt insertion portion.

* * * * *